US009133759B2

(12) United States Patent
Gibby

(10) Patent No.: US 9,133,759 B2
(45) Date of Patent: Sep. 15, 2015

(54) SYSTEMS, DEVICES AND METHODS FOR PROVIDING AIRFLOW TO AN AIR COMPRESSOR

(75) Inventor: Dale G. Gibby, Columbus, IN (US)

(73) Assignee: Cummins Inc., Columbus, IN (US)

( * ) Notice: Subject to any disclaimer, the term of this patent is extended or adjusted under 35 U.S.C. 154(b) by 307 days.

(21) Appl. No.: 13/534,328

(22) Filed: Jun. 27, 2012

(65) Prior Publication Data

US 2014/0000570 A1 Jan. 2, 2014

(51) Int. Cl.

| | |
|---|---|
| ***F02B 33/44*** | (2006.01) |
| ***F02B 37/00*** | (2006.01) |
| ***F17D 1/04*** | (2006.01) |

(52) U.S. Cl.

CPC . *F02B 37/00* (2013.01); *F17D 1/04* (2013.01); *Y02T 10/144* (2013.01); *Y10T 137/0396* (2015.04); *Y10T 137/85986* (2015.04)

(58) Field of Classification Search

CPC ....... Y02T 10/144; F02B 37/16; F02B 33/44; F02B 37/164; F02B 37/127; F02D 41/00007

USPC .......................... 60/286, 598, 602; 123/559.1

See application file for complete search history.

(56) References Cited

U.S. PATENT DOCUMENTS

| | | | |
|---|---|---|---|
| 3,027,706 A | 4/1962 | Sprick | |
| 3,389,553 A * | 6/1968 | Hardy et al. | 417/28 |
| 4,299,090 A | 11/1981 | Deutschmann | |
| 4,464,902 A | 8/1984 | Mendle et al. | |
| 5,427,079 A * | 6/1995 | Andrepont, Jr. et al. | 123/561 |
| 5,440,881 A | 8/1995 | Sudmanns et al. | |
| 6,261,333 B1 | 7/2001 | Dickson | |
| 6,766,645 B2 | 7/2004 | Zimmer et al. | |
| 7,043,915 B2 | 5/2006 | Anello | |
| 8,096,289 B2 * | 1/2012 | Braun et al. | 123/568.11 |
| 2010/0314186 A1 * | 12/2010 | Ma | 180/165 |
| 2011/0067678 A1 * | 3/2011 | Burkhardt et al. | 123/559.1 |
| 2011/0081257 A1 * | 4/2011 | Kley et al. | 417/53 |

* cited by examiner

*Primary Examiner* — Thomas Denion
*Assistant Examiner* — Thomas Olszewski
(74) *Attorney, Agent, or Firm* — Taft Stettinius & Hollister LLP

(57) ABSTRACT

Systems, devices, and methods are disclosed for diverting a portion of intake airflow from a pressure source to an air compressor in an internal combustion engine system. The intake airflow is diverted for air compressor airflow at the intake of the pressure source before it is pressurized by the pressure source.

25 Claims, 4 Drawing Sheets

144 154 152 142 112 140 120 150 113

SYSTEMS, DEVICES AND METHODS FOR PROVIDING AIRFLOW TO AN AIR COMPRESSOR

FIELD OF THE INVENTION

The present invention relates generally to internal combustion engines and engine driven air compressor systems, and more particularly to systems, devices and methods for providing airflow to an air compressor in such systems.

BACKGROUND

Environmental concerns, legislative mandates, and operating costs are increasing demand for improved fuel economy for internal combustion engines. Some internal combustion engine systems bleed or divert a portion of pressurized air from an intake to the internal combustion engine into the inlet of an air compressor, reducing the overall work of the compressor for the same output. However, the use of pressurized intake air to drive flow into the air tank reduces fuel economy since boosted air is diverted from the intake to the engine, which is difficult to compensate for in engine controls, thus causing the engine to run at non-optimal fueling.

Furthermore, systems which provide non-boosted fresh airflow to the compressor require significant plumbing additions, which can affect the operating conditions of the engine. For example, turbocharged engine systems require plumbing to be added to provide a separate fresh air intake to the air compressor, and/or require plumbing additions at locations significantly spaced apart from the turbocharger compressor to avoid oil pull-over from the air compressor. These off-engine plumbing solutions require application-specific hardware design, thus creating a lack of continuity in the design and the need to develop new designs for new applications. These systems may also require separate filtration for the air compressor air supply, which increases ownership costs and decreases reliability. Therefore, further technological developments are desirable in this area.

SUMMARY

One embodiment is a unique system for providing non-boosted airflow to an air compressor from an intake of an internal combustion engine system. Other embodiments include unique systems, methods and devices to provide fresh airflow or intake airflow to an air compressor in engine-driven air compressor systems. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DESCRIPTION OF THE ILLUSTRATIVE EMBODIMENTS

Figure 1:
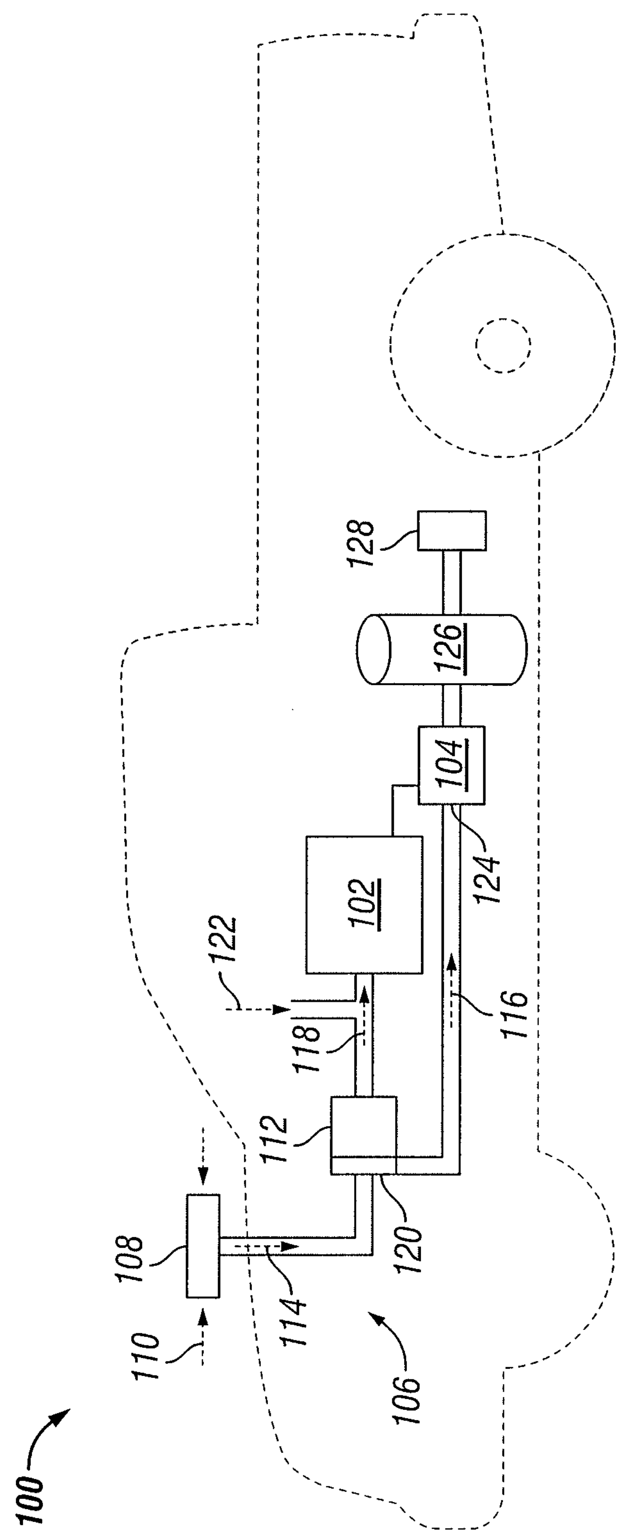
FIG. 1 is a schematic block diagram of one embodiment of an internal combustion engine and air compressor system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic block diagram of one embodiment of a system 100 for a vehicle with an internal combustion engine 102 and an engine-driven air compressor 104. The system 100 includes an air intake assembly 106 to provide a source of intake fresh airflow 114 to engine 102 and air compressor 104. The air intake assembly 106 includes an air inlet 108 that draws ambient air 110 toward a pressure source 112. The pressure source 112 receives intake fresh airflow 114 from inlet 108 and outlets a pressurized engine fresh airflow 118. In certain embodiments, the pressure source 112 is a turbocharger, however, in other embodiments the pressure source can be a positive displacement supercharger, a dynamic compression supercharger, and/or any other device capable of receiving and outputting the intake fresh airflow 114 with increased pressure.

In certain embodiments, the air intake assembly 106 may include a number of features not shown in FIG. 1, including an air filter, noise reduction and flow altering devices, such as, but not limited to, baffles. Furthermore, the pressure source 112 can be in flow communication with a charge air cooler or an intercooler between pressure source 112 and the engine 102. A flow meter, such as mass airflow sensor (MAF), can be disposed upstream of the pressure source 112, such as at or near a compressor inlet of a turbocharger.

Upstream of pressure source 112, a diverter 120 diverts intake fresh airflow 114 to a compressor fresh airflow 116 bound for air compressor 104. Downstream of the pressure source 112, the pressurized airflow can be provided as engine fresh airflow 118 bound for an internal combustion engine 102. The internal combustion engine 102 can be a diesel engine, a gasoline engine, or any other type of internal combustion engine 102. The system 100 can further include an exhaust gas recirculation system 122 which recirculates a portion of exhaust gas that mixes with the engine fresh airflow 118 bound for the internal combustion engine 102 downstream of the pressure source 112.

The air compressor 104 receives the compressor fresh airflow 116 at an inlet 124. It is contemplated that air compressor 104 can be any known compressor, such as a single cylinder positive-displacement air compressor, a multiple piston positive-displacement compressor, a rotating impeller-type compressor, or any type of compressor which receives and outputs the compressor fresh airflow 116 with increased pressure. It is also contemplated that air compressor 104 is mechanically coupled to engine 102. The compressed air from the air compressor 104 can be stored in an air tank 126. The compressed air can be provided to a pneumatic device 128, such as, but not limited to, air brakes, suspension equipment, and/or any other pneumatic devices or systems of the vehicle.

Figure 2:
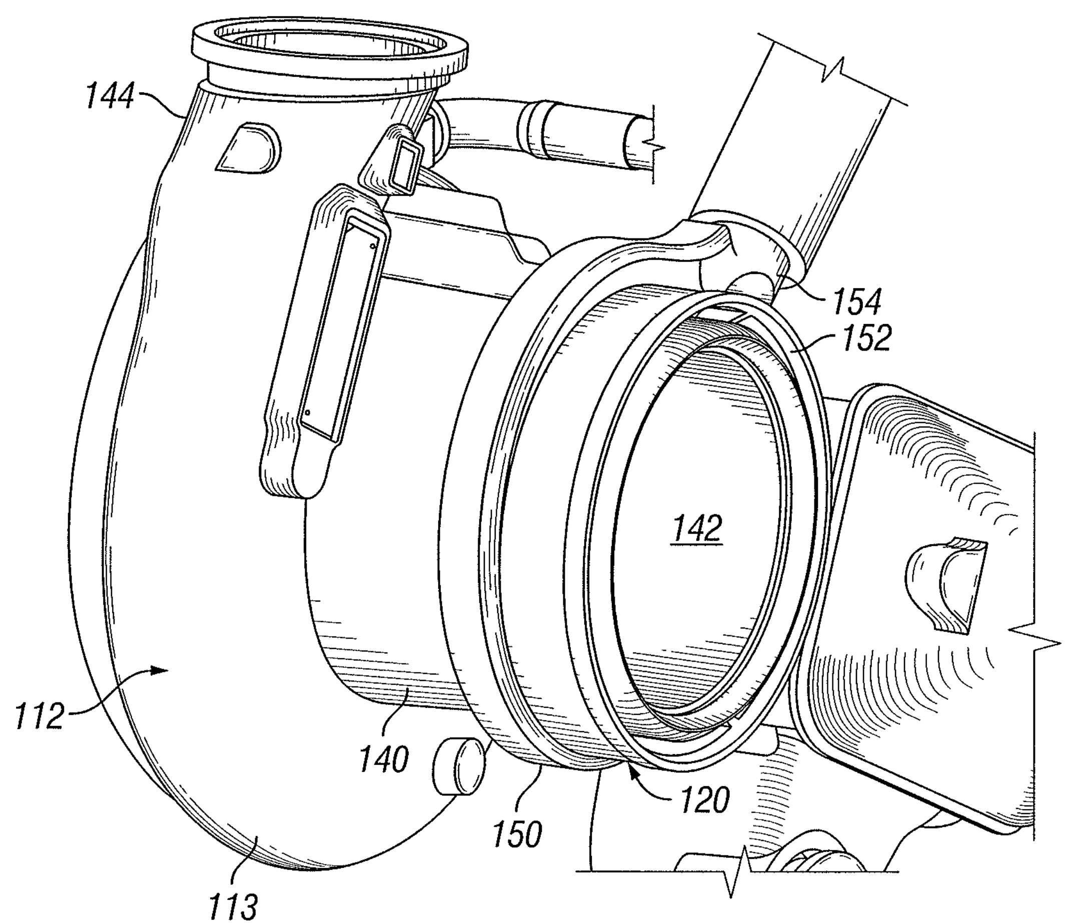
FIG. 2 is a perspective view of a diverter mounted to an inlet of a pressure source.

Referring to FIG. 2, one embodiment of diverter 120 is shown mounted to the inlet side of pressure source 112. Pressure source 112 includes a housing 113 that includes an inlet 140 defining a passage 142 for receiving fresh airflow 114 from air inlet 108. Housing 113 of pressure source 112 further includes an outlet 144 for delivering pressurized engine airflow 118 to engine 102. Diverter 120 includes a body 150 mounted to inlet 142 that defines a diversion passage 152 that receives fresh airflow 114 before it is pressurized by pressure source 112. The diverted fresh airflow 114 is passed through an outlet member 154 to provide compressor airflow 116 to air compressor 102.

Figure 3:
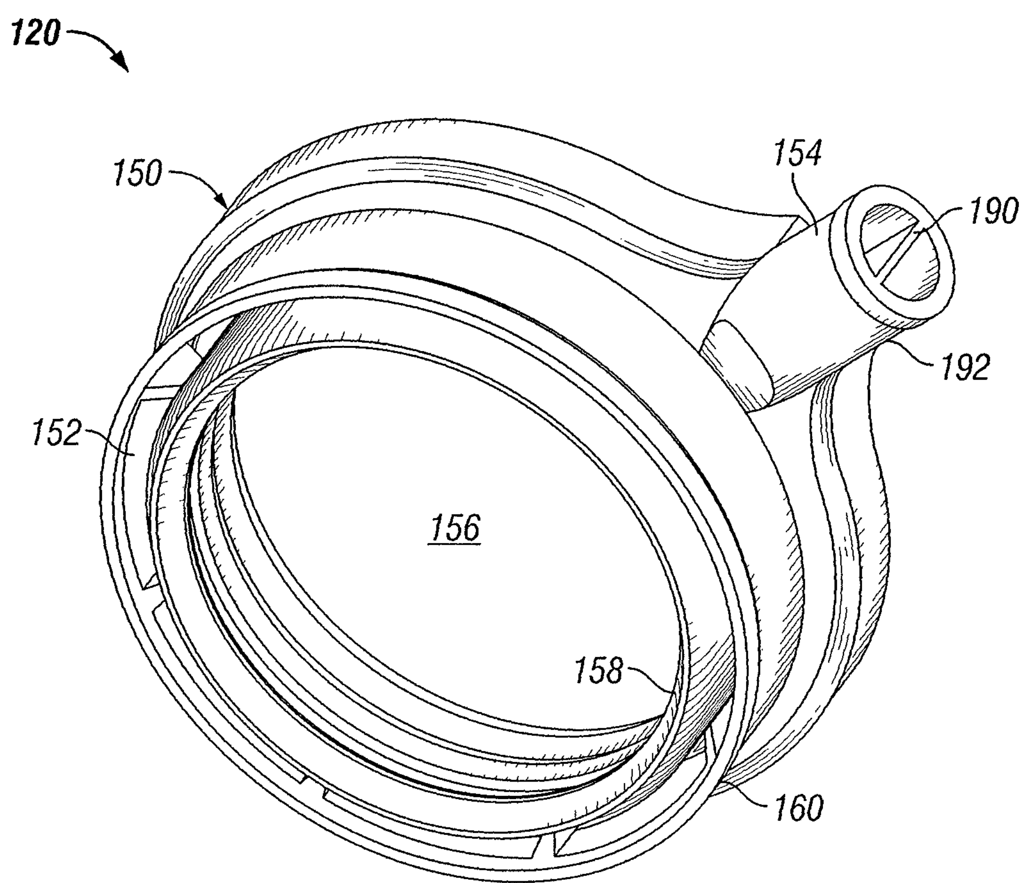
FIG. 3 is a perspective view of the diverter of FIG. 2.
Figure 4:
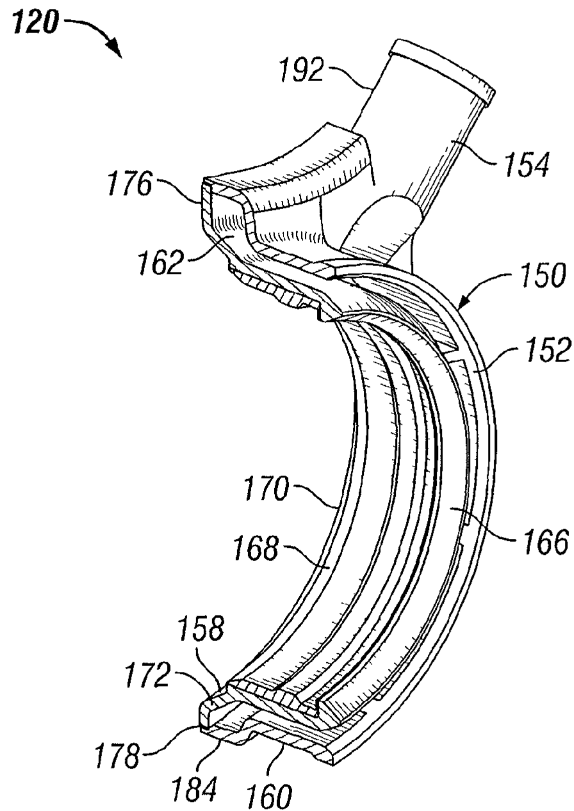
FIG. 4 is a section view of the diverter of FIG. 3.
Figure 5:
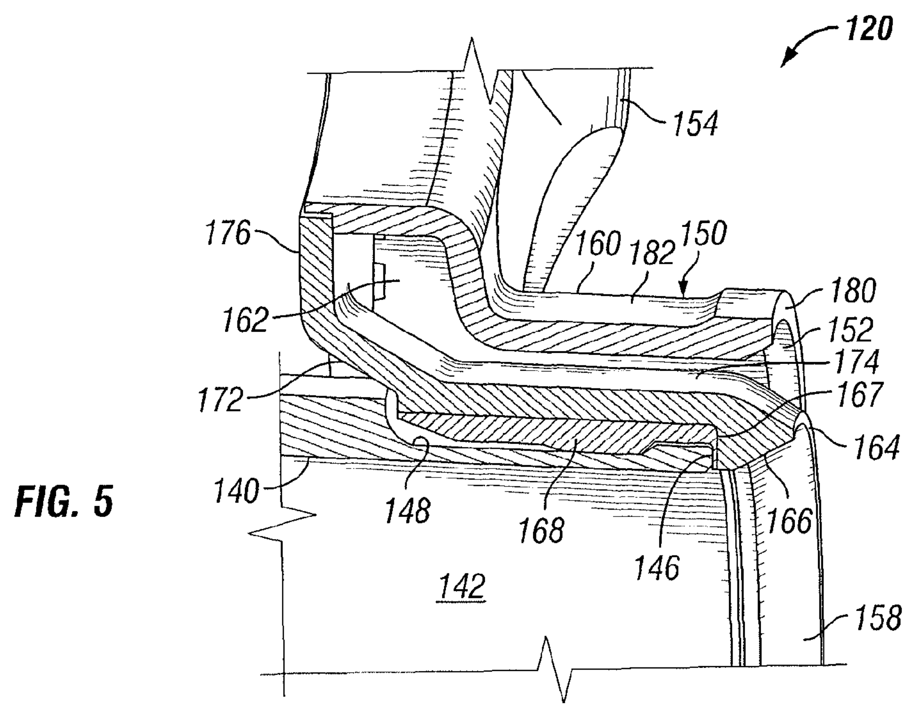
FIG. 5 is a section view of a portion of the diverter of FIG. 2 mounted to an inlet of the pressure source.

Referring further to FIGS. 3-5, additional details of the illustrated embodiment of diverter 120 will be discussed. Diverter body 150 includes a cylindrical shape with an inner surface that defines a central passage 156 for receiving pressure source inlet 140. Central passage 156 is isolated from diversion passage 152 by an inner member 158 and inlet 140. Diversion passage 152 extends between and is defined by inner member 158 and an outer member 160. In the illustrated embodiment, inner member 158 and outer member 160 each define a cylindrical shape with inner member 158 position concentrically within and spaced from outer member 160 so that diversion passage 152 extends completely around inner member 158. Inlet 140 is received in central passage 156 concentrically within inner member 158. Diversion passage 152 is further in flow communication with an outlet passage 162 defined by outlet member 154.

Inner member 158 includes an inner inlet end 164 that defines a radially inwardly extending flange 166 with a lip 167 that abuts the outer end 146 of inlet 140. Flange 166 defines a body that tapers in thickness from lip 167 to inner inlet end 164 which facilitates the diversion of airflow into diversion passage 152. Inlet 140 further includes an outwardly facing and circumferentially extending grooved area 148 that receives a seal 168 positioned along an inner surface of inner member 158 to provide a sealed mounting arrangement of diverter 120 on inlet 140. Seal 168 can be co-molded, adhered, frictionally engaged, or otherwise secured to the inner surface of inner member 158. In one embodiment, the mounting arrangement permits circumferential rotation of diverter 120 around inlet 140 but axially secures diverter 120 to inlet 140.

Inner member 158 includes a second inner end 170 opposite inner inlet end 164 that extends radially outwardly from inlet 140. Inner member 158 further includes an angled portion 172 that extends obliquely from a cylindrical portion 174 to second inner end 170. Cylindrical portion 174 extends between angled portion 172 and flange 166. Inner member 158 further includes an end flange 176 extending radially outwardly from angled portion 172 that is orthogonally oriented to cylindrical portion 174 and mates with outlet member 154, as discussed further below. The portion of second inner end 170 of inner member 158 extending circumferentially from end flange 176 defines a lip 178 that is mated with outer member 160, as discussed further below.

Outer member 160 includes an outer inlet end 180 that is aligned with and spaced from inner inlet end 164 of inner member 158. Outer member 160 further includes cylindrical portion 182 extending from outer inlet end 180 to outlet member 154. Outlet member 154 extends outwardly from a side of cylindrical portion 182 and defines outlet passage 162 with end flange 176 of inner member 158. Outer member 160 also includes a lipped portion 184 extending outwardly and angularly from cylindrical portion 182 and circumferentially around cylindrical portion 182.

End flange 176 and lip 178 of inner member 158 are engaged to aligned surfaces of outer member 160 defined by outlet member 154 and lip portion 184, respectively, to form diverter body 150. For example, outlet member 154 and lipped portion 184 can define notched regions that are shaped to receive end flange 176 and lip 178 in form fitting engagement to provide a solid wall opposite inlet ends 164, 180 so that airflow is diverted from diversion passage 152 into outlet passage 162. In one specific embodiment, diverter 120 is made by injection molding plastic material in two parts represented by inner member 158 and outer member 160. The two parts are joined by a weld or other suitable fastening device or technique along mating surfaces of end flange 176 and outlet member 154 and along mating surfaces of lip 178 and lip portion 184 to form an integral, one-piece body 150. Seal 168 can be co-molded on the inner surface of inner member 158 or secured thereto by any suitable arrangement. Furthermore, diverter 120 can be engaged to inlet 140 by any one or combination of a sealingly tight fit with seal 168, a friction fit, fasteners, clamps, bolts, screws, weld, or other retention device or method.

Outlet member 154 is connected with plumbing extending to air compressor 104. In one embodiment, outlet member 154 includes an internal rib 190 that stiffens outlet member 154 along its tubular portion 192. Any suitable fastening arrangement connection of the air compressor plumbing to outlet member 154 is contemplated.

The arrangement of inner member 158 and outer member 160 in creating diversion passage 152 provides a ram air feature that prevents the formation of a venturi effect or vacuum at inlet 140 which could result in oil pull-over from compressor 104, particularly at high airflow conditions to the pressure source 112. The provision of diversion passage 152 completely around the circumference of inlet 140 also avoids disruption of the airflow pattern to pressure source 112. Furthermore, the apparatus providing the diversion of fresh airflow 114 is mounted on the inlet of the turbocharger compressor which eases assembly and eliminates the need for separate plumbing to be installed by a third party to provide fresh airflow to the air compressor 104. The elimination of separate plumbing also eliminates the need for additional filtration, and provides an air take-off for the air compressor that can be used for any engine application.

As evident from the drawings and description provided herein, various aspects of the disclosure are contemplated. According to one aspect, there is disclosed a method comprising creating a fresh airflow in an intake of an internal combustion engine system; pressurizing the fresh airflow with a pressure source having an inlet for receiving the fresh airflow and an outlet for the pressurized fresh airflow; and diverting a portion of the fresh airflow at the inlet of the pressure source to an air compressor system.

In further refinements of this aspect, any one or combination of the following is contemplated. The pressure source is a compressor of a turbocharger and the air compressor is driven by an engine of the internal combustion engine system; diverting the portion of the fresh airflow includes providing a diversion passage around a circumference of the inlet to the pressure source, the diversion passage receiving the portion of fresh airflow; the fresh airflow received in the diversion passage is directed to an outlet passage in flow communication with the air compressor; a ram air feature is provided at the inlet to the pressure source to prevent oil pull-over from the air compressor to the pressure source; and the inlet and the outlet of the pressure source form respective portions of a housing of the pressure source.

According to another aspect, a system comprises an airflow bound for a pressure source and a first flowpath operably coupled to receive a first portion of the airflow from the pressure source after pressurization of the airflow by the pressure source. The first flowpath is configured to provide the first portion of the airflow to an internal combustion engine. The system also includes a second flowpath operably coupled to receive a second portion of the airflow from an inlet of the pressure source. The second flowpath is configured to provide the second portion of the airflow to an air compressor without the second portion of the airflow being pressurized by the pressure source while the first portion of the airflow is pressurized by the pressure source.

In further refinements of this aspect, any one or combination of the following is contemplated. The inlet comprises a portion of a housing of a turbocharger compressor; a diverter is mounted to the inlet of the turbocharger compressor and the diverter is configured to create the second portion of the airflow and is in flow communication with the second flowpath; the diverter comprises an inner member extending between an inner inlet end and an opposite inner second end with the inner member defining a central passage that receives the inlet of the pressure source, and an outer member extending between an outer inlet end and an opposite outer second end that mates with the inner second end of the inner member, with the inner and outer members defining a diversion passage therebetween that opens at the inner and outer inlet ends to receive the second portion of the airflow; the diverter includes an opening to a diversion passage is substantially aligned with an opening into the inlet of the pressure source; the diverter includes an outlet member extending outwardly from the outer member of the diverter that defines an outlet passage in flow communication with the diversion passage; the inlet of the pressure source is positioned concentrically in the inner member of the diverter and the inner member is positioned concentrically in the outer member of the diverter; the inner member of the diverter includes a flange defining a lip that abuttingly engages the inlet of the pressure source and the flange tapers in thickness from the lip to the inner inlet end; and the inner member of the diverter includes an inner surface extending around the central passage and a seal is engaged to the inner surface that sealingly engages an outer surface of the inlet of the pressure source.

According to another aspect, an apparatus comprises a pressure source including an inlet for receiving an airflow and an outlet for pressurized airflow produced by the pressure source to be delivered to an internal combustion engine. The apparatus also includes a diverter mounted to the inlet of the pressure source to divert a portion of the airflow to an air compressor without pressurization by the pressure source while the pressure source is producing pressurized airflow to the internal combustion engine.

In further refinements of this aspect, any one or combination of the following is contemplated. The pressure source is a turbocharger compressor and the inlet is a part of a housing of the turbocharger compressor; the diverter is mounted circumferentially to the inlet of the turbocharger compressor; the diverter defines a diversion passage that is arranged concentrically around the inlet of the pressure source; the diverter includes a flange extending from the inlet in a first direction that is opposite the direction of airflow into the inlet, the flange tapering in width in the first direction to an inner inlet end, the inner inlet end defining an inner side of an opening into the diversion passage; the flange of the diverter defines a lip that abuttingly engages the inlet; the diverter includes an outer member positioned concentrically around the inner member, the outer member including an outer inlet end aligned with the inner inlet end of the inner member, the outer inlet end defining an outer side of the opening into the diversion passage; the diverter comprises an inner member extending between an inner inlet end and an opposite inner second end with the inner member defining a central passage that receives the inlet of the pressure source, and the diverter comprises an outer member extending between an outer inlet end and an opposite outer second end engaged with the inner second end of the inner member, the inner and outer members defining a diversion passage therebetween that opens through the inner and outer inlet ends; the opening of the diversion passage of the diverter extends concentrically around an opening into the inlet of the pressure source; the opening of the diversion passage of the diverter extends completely around the inlet; the diverter includes an outlet member extending outwardly from the outer member and the outlet member defines an outlet passage in flow communication with the diversion passage; the inner member of the diverter includes a flange defining a lip that abuttingly engages the inlet of the pressure source and the flange extends from and tapers in thickness from the lip to the inner inlet end; and the inner member of the diverter includes an inner surface extending around the central passage and a seal engaged to the inner surface that sealingly engages an outer surface of the inlet of the pressure source.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
creating a fresh airflow in an intake of an internal combustion engine system;
pressurizing the fresh airflow with a pressure source having an inlet for receiving the fresh airflow and an outlet for the pressurized fresh airflow; and
diverting a portion of the fresh airflow at the inlet of the pressure source to an air compressor system, wherein diverting the portion of the fresh airflow includes providing a diversion passage around a circumference of the inlet to the pressure source, the diversion passage receiving the portion of fresh airflow.

2. The method of claim 1, wherein the pressure source is a compressor of a turbocharger and the air compressor is driven by an engine of the internal combustion engine system.

3. The method of claim 1, wherein the fresh airflow received in the diversion passage is directed to an outlet passage in flow communication with the air compressor.

4. The method of claim 3, further comprising an outer member around the inlet of the pressure source that forms an opening to the diversion passage.

5. The method of claim 1, wherein the inlet and the outlet of the pressure source form respective portions of a housing of the pressure source.

6. A system, comprising:
an airflow bound for a pressure source;
a first flowpath operably coupled to receive a first portion of the airflow from the pressure source after pressurization of the airflow by the pressure source, wherein the first flowpath is configured to provide the first portion of the airflow to an internal combustion engine;
a second flowpath operably coupled to receive a second portion of the airflow from an inlet of the pressure source, wherein the second flowpath is configured to provide the second portion of the airflow to an air compressor without the second portion of the airflow being pressurized by the pressure source while the first portion of the airflow is pressurized by the pressure source;

a diverter mounted to an inlet of the pressure source, wherein the diverter is configured to create the second portion of the airflow and is in flow communication with the second flowpath, wherein the diverter comprises:

an inner member extending between an inner inlet end and an opposite inner second end, the inner member defining a central passage that receives the inlet of the pressure source; and an outer member extending between an outer inlet end and an opposite outer second end that mates with the inner second end of the inner member, the inner and outer members defining a diversion passage therebetween that opens at the inner and outer inlet ends to receive the second portion of the airflow.

7. The system of claim 6, wherein the inlet comprises a portion of a housing of a turbocharger compressor.

8. The system of claim 7, wherein the diverter is mounted to the inlet of the turbocharger compressor.

9. The system of claim 6, wherein the opening of the diversion passage is substantially aligned with an opening into the inlet of the pressure source.

10. The system of claim 6, further comprising an outlet member extending outwardly from the outer member of the diverter that defines an outlet passage in flow communication with the diversion passage.

11. The system of claim 6, wherein the inlet of the pressure source is positioned concentrically in the inner member and the inner member is positioned concentrically in the outer member.

12. The system of claim 6, wherein the inner member includes a flange defining a lip that abuttingly engages the inlet of the pressure source, and the flange tapers in thickness from the lip to the inner inlet end.

13. The system of claim 6, wherein the inner member includes an inner surface extending around the central passage and a seal is engaged to the inner surface that sealingly engages an outer surface of the inlet of the pressure source.

14. An apparatus, comprising:

a pressure source including an inlet for receiving an airflow and an outlet for pressurized airflow produced by the pressure source to be delivered to an internal combustion engine; and a diverter mounted to the inlet of the pressure source to divert a portion of the airflow to an air compressor without pressurization by the pressure source while the pressure source is producing pressurized airflow to the internal combustion engine, wherein the diverter defines a diversion passage that is arranged concentrically around the inlet of the pressure source.

15. The apparatus of claim 14, wherein the pressure source is a turbocharger compressor and the inlet is a part of a housing of the turbocharger compressor.

16. The apparatus of claim 15, wherein the diverter is mounted circumferentially to the inlet of the turbocharger compressor.

17. The apparatus of claim 14, wherein the diverter includes a flange extending from the inlet in a first direction that is opposite the direction of airflow into the inlet, the flange tapering in width in the first direction to an inner inlet end, the inner inlet end defining an inner side of an opening into the diversion passage.

18. The apparatus of claim 17, wherein the flange defines a lip that abuttingly engages the inlet.

19. The apparatus of claim 17, wherein the diverter includes an outer member positioned concentrically around the inner member, the outer member including an outer inlet end aligned with the inner inlet end of the inner member, the outer inlet end defining an outer side of the opening into the diversion passage.

20. The apparatus of claim 14, wherein the diverter comprises:

an inner member extending between an inner inlet end and an opposite inner second end, the inner member defining a central passage that receives the inlet of the pressure source; and an outer member extending between an outer inlet end and an opposite outer second end engaged with the inner second end of the inner member, the inner and outer members defining the diversion passage therebetween that opens through the inner and outer inlet ends.

21. The apparatus of claim 20, wherein the opening of the diversion passage extends concentrically around an opening into the inlet of the pressure source.

22. The apparatus of claim 20, wherein the opening of the diversion passage extends completely around the inlet.

23. The apparatus claim 20, further comprising an outlet member extending outwardly from the outer member, the outlet member defining an outlet passage in flow communication with the diversion passage.

24. An apparatus, comprising:

a pressure source including an inlet for receiving an airflow and an outlet for pressurized airflow produced by the pressure source to be delivered to an internal combustion engine; and a diverter mounted to the inlet of the pressure source to divert a portion of the airflow to an air compressor without pressurization by the pressure source while the pressure source is producing pressurized airflow to the internal combustion engine, wherein the diverter comprises:

an inner member extending between an inner inlet end and an opposite inner second end, the inner member defining a central passage that receives the inlet of the pressure source; and an outer member extending between an outer inlet end and an opposite outer second end engaged with the inner second end of the inner member, the inner and outer members defining a diversion passage therebetween that opens through the inner and outer inlet ends, wherein the inner member includes a flange defining a lip that abuttingly engages the inlet of the pressure source, and the flange extends from and tapers in thickness from the lip to the inner inlet end.

25. An apparatus, comprising:

a pressure source including an inlet for receiving an airflow and an outlet for pressurized airflow produced by the pressure source to be delivered to an internal combustion engine; and a diverter mounted to the inlet of the pressure source to divert a portion of the airflow to an air compressor without pressurization by the pressure source while the pressure source is producing pressurized airflow to the internal combustion engine, wherein the diverter comprises:

an inner member extending between an inner inlet end and an opposite inner second end, the inner member defining a central passage that receives the inlet of the pressure source; and an outer member extending between an outer inlet end and an opposite outer second end engaged with the inner second end of the inner member, the inner and outer members defining a diversion passage therebetween that opens through the inner and outer inlet ends, wherein the inner member includes an inner surface extending around the central passage and a seal engaged to the inner surface that sealingly engages an outer surface of the inlet of the pressure source.

* * * * *